US005940979A

United States Patent [19]

Ericksen et al.

[11] Patent Number: 5,940,979

[45] Date of Patent: Aug. 24, 1999

[54] MARKING TEMPLATE FOR LOCATING HOLES FOR INSTALLATION OF DOOR AND DRAWER HARDWARE

[76] Inventors: Colin Ericksen, 110 W. 6th Ave., #177, Ellensburg, Wash. 98926; Richard Hardwick, 223 Model Farm Rd., Highpoint, N.C. 27263; Jeffrey Asher, 4091 Hastings Rd., Kennersville, N.C. 27284

[21] Appl. No.: 08/988,089

[22] Filed: Dec. 10, 1997

[51] Int. Cl.[6] ................................ B25H 7/00; G01B 3/14

[52] U.S. Cl. ................................ 33/667; 33/194; 33/679; 33/42; 33/562

[58] Field of Search ............................ 33/667, 194, 197, 33/533, 613, 645, 644, 666, 669, 677, 679, 562, 563, 566, 574, 41.1, 41.6, 42

[56] References Cited

U.S. PATENT DOCUMENTS

| | | | |
|---|---|---|---|
| 313,197 | 3/1885 | Gaylord | 33/562 |
| 778,521 | 12/1904 | Wheat | 33/42 |
| 788,802 | 5/1905 | Vreeland | 33/42 |
| 990,502 | 4/1911 | Richardson | 33/42 |
| 1,656,143 | 1/1928 | Colby | 33/197 |
| 2,473,639 | 6/1949 | Erickson | 33/667 |
| 2,842,860 | 7/1958 | Gray . | |
| 3,039,199 | 6/1962 | Maag | 33/667 |
| 3,104,467 | 9/1963 | Lloyd-Young | 33/42 |
| 3,246,399 | 4/1966 | Southern . | |
| 3,381,387 | 5/1968 | Landrum, Jr. | 33/679 |
| 3,583,823 | 6/1971 | Eaton et al. . | |
| 4,257,166 | 3/1981 | Barker et al. | 33/667 |
| 4,936,020 | 6/1990 | Neblett | 33/566 |
| 4,952,101 | 8/1990 | Coombs . | |
| 5,349,758 | 9/1994 | Bear . | |

*Primary Examiner*—Christopher W. Fulton

*Attorney, Agent, or Firm*—H. Jay Spiegel

[57] ABSTRACT

A marking template includes a flat body having a bottom edge and two slots perpendicular to the bottom edge. The slots guide movements of a fitting between extremes defined by the ends of the slots. The fitting includes a flat bottom edge and a triangular edge portion dividing the flat bottom edge into two spaced portions. The triangular edge portion defines a right angle and is designed to receive the corner of a door or drawer face to allow marking of holes from the perspective of the corner of the door or drawer face. The flat bottom edge allows placement of the inventive marking template along one of the side edges of a door or drawer face. In one embodiment of the present invention, a lower portion of the marking template includes a plurality of spaced holes along with various indicia marking the location of each hole as well as other locations on the bottom edge of the body. In a second embodiment, measurement indicia are provided to either side of a slot elongated perpendicular to the two above-mentioned slots. In this last-mentioned slot, a plurality of clamp members are provided, each of which includes a through hole and may be locked at any desired location along the last-mentioned slot.

15 Claims, 5 Drawing Sheets

MARKING TEMPLATE FOR LOCATING HOLES FOR INSTALLATION OF DOOR AND DRAWER HARDWARE

BACKGROUND OF THE INVENTION

The present invention relates to a marking template for locating holes for installation of door and drawer hardware. In the prior art, marking templates of various kinds are known. However, Applicants are unaware of any such device including all of the features and aspects of the present invention.

It would be helpful if a marking template could be devised that would allow marking of locations for drilling holes for installation of door and drawer hardware both from the perspective of a side edge of a door or drawer as well as from the perspective of a corner thereof. It is with this need in mind that the present invention was developed.

SUMMARY OF THE INVENTION

The present invention relates to a marking template for locating holes for installation of door and drawer hardware. The present invention includes the following interrelated objects, aspects and features:

(1) In a first aspect, the inventive marking template includes a flat body having a bottom edge and two slots perpendicular thereto.

(2) The slots guide movements of a fitting between extremes defined by the ends of the slots. The fitting includes a flat bottom edge and a triangular edge portion dividing the flat bottom edge into two spaced portions. The triangular edge portion defines a right angle and is designed to receive the corner of a door or drawer to allow marking of holes from the perspective of the corner of the door. The flat bottom edge allows placement of the inventive marking template along one of the side or top edges of a door or drawer.

(3) In one embodiment of the present invention, a lower portion of the marking template includes a plurality of spaced holes along with various indicia marking the location of each hole as well as other locations on the bottom edge of the body.

(4) In a second embodiment, measurement indicia are provided to either side of a slot elongated perpendicular to the two above-mentioned slots. In this last-mentioned slot, a plurality of clamp members are provided, each of which includes a hole therethrough and includes locking means allowing locking of position of a clamp member at any desired location along the last-mentioned slot.

(5) In the preferred embodiment of the present invention, the body and fitting and clamp members are preferably made of a material such as molded plastic, of course, materials such as metal and wood may also be employed.

As such, it is a first object of the present invention to provide a marking template for locating holes for installation of door and drawer hardware.

It is a further object of the present invention to provide such a template including a fitting allowing engagement of the inventive template along a door or drawer edge or corner.

It is a further object of the present invention to provide such a template including indicia allowing measuring various locations on a door.

It is a still further object of the present invention to provide such a device including, in one embodiment thereof, a plurality of clamp members, the positions of which are adjustable along a slot.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
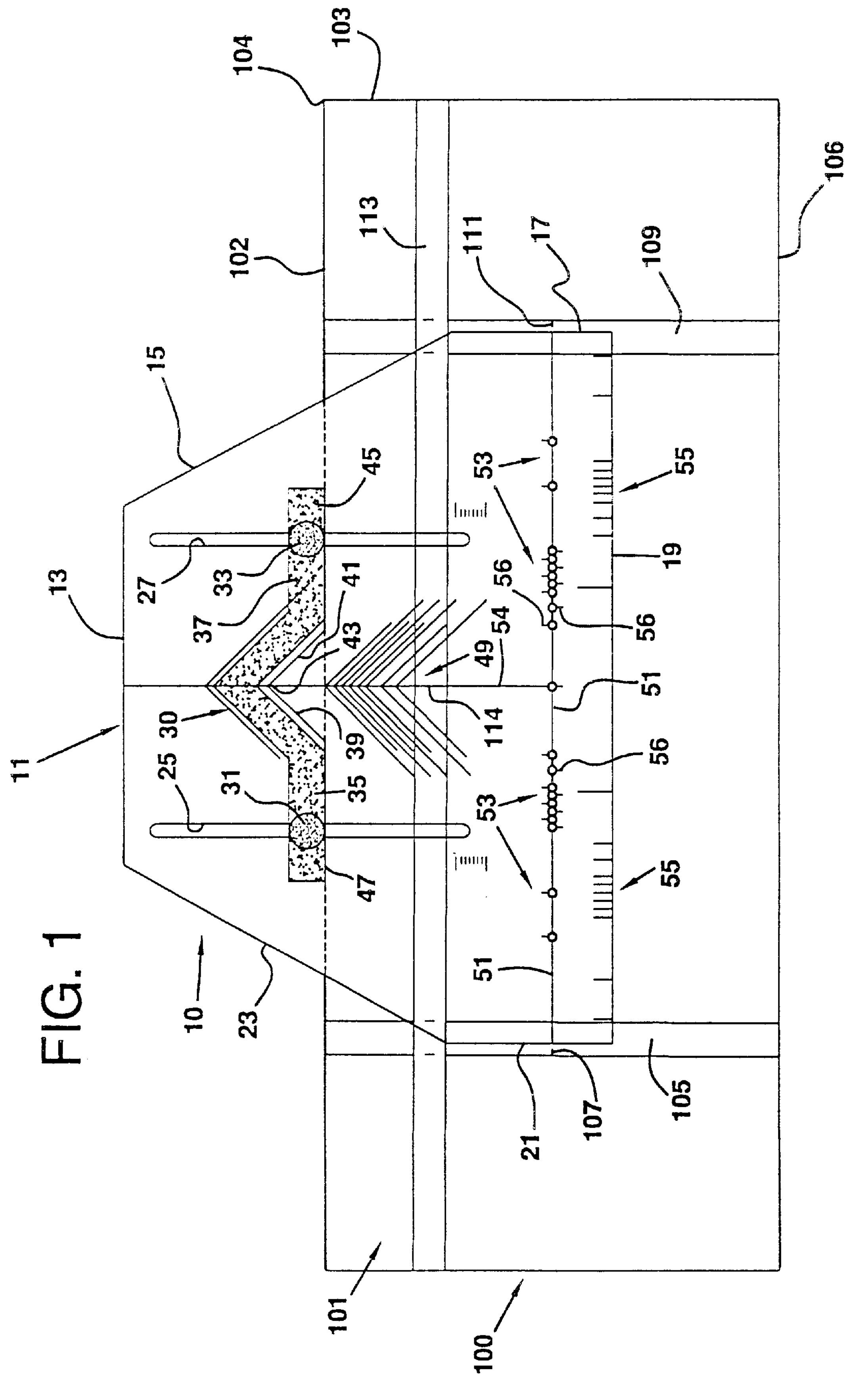
FIG. 1 shows a top view of a first embodiment of the present invention used on a drawer facing.
Figure 2:
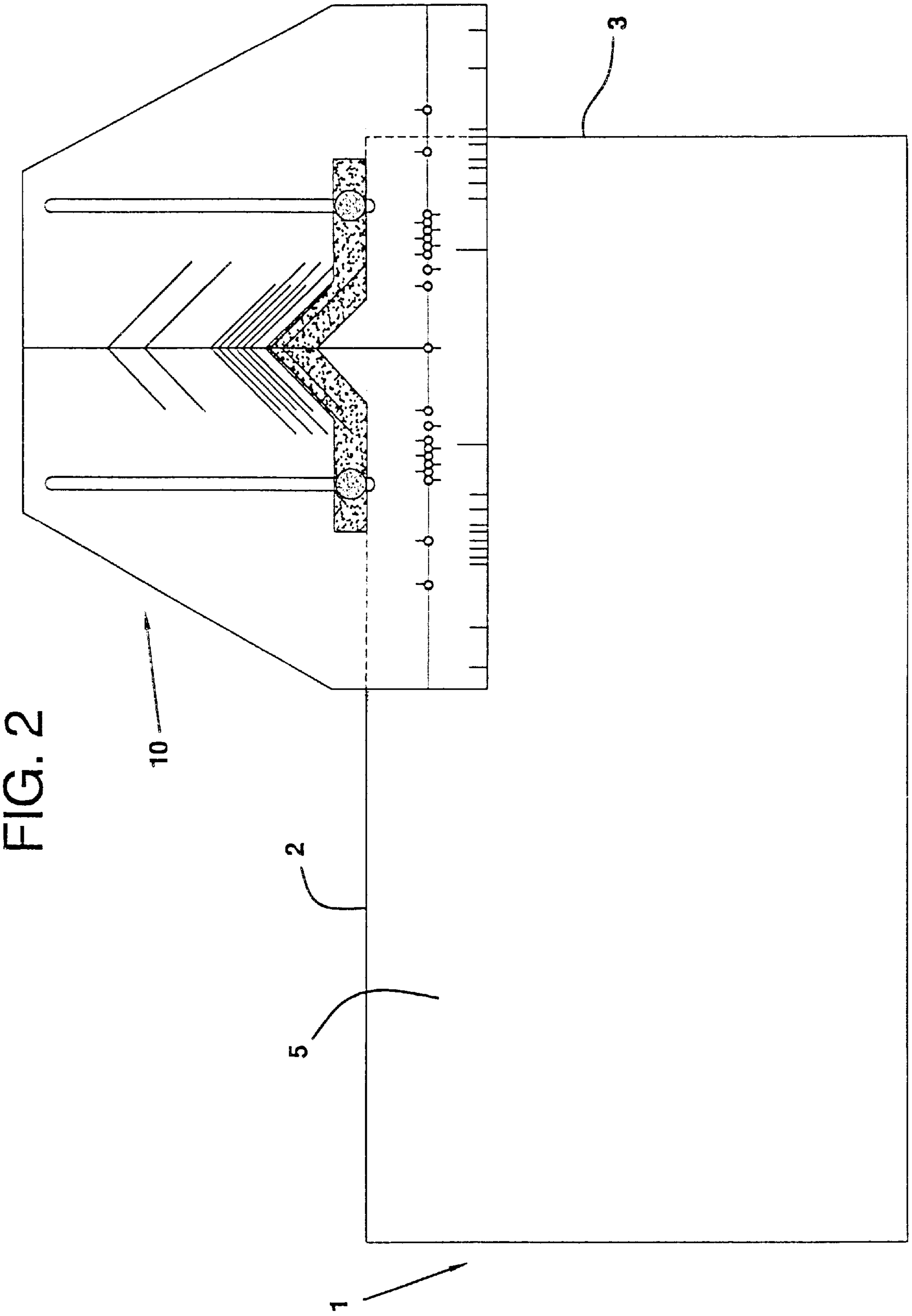
FIG. 2 shows a view similar to that of FIG. 1 but with the embodiment of marking template engaging the side edge of a door.
Figure 3:
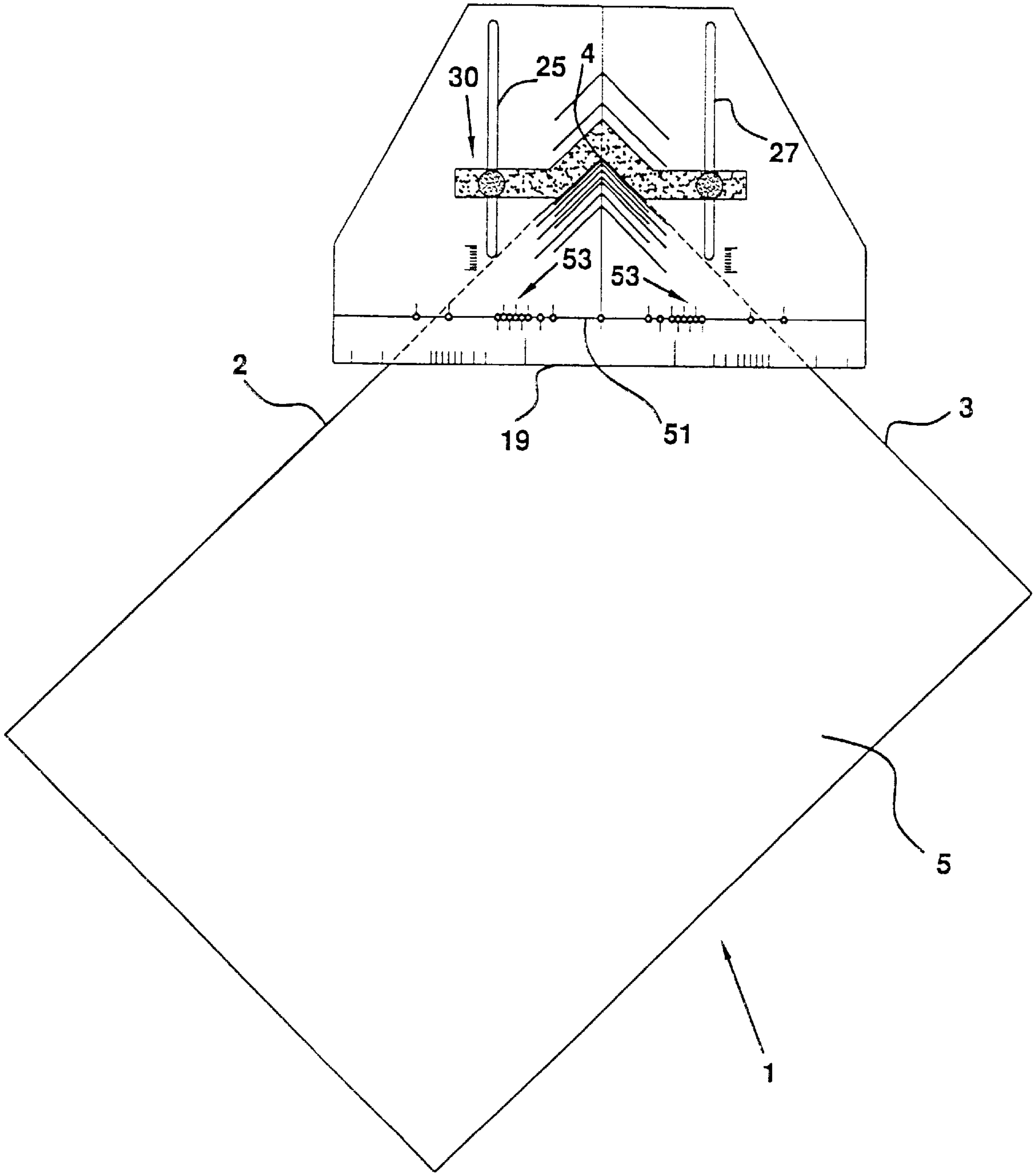
FIG. 3 shows a view similar to that of FIGS. 1 and 2 but with the marking template engaging a corner of a door.

With reference, first, to FIGS. 1–3, a first embodiment of the present invention is generally designated by the reference numeral 10 and is seen to include a body 11 having sides 13, 15, 17, 19, 21 and 23. The side 19 consists of a bottom edge of the body 11 while the side 13 comprises a top edge thereof. As seen in FIGS. 1–3, a series of indicia measure the distances in inches to either side of a centerline 54.

With further reference to FIGS. 1–3, it is seen that a pair of slots 25, 27 entend perpendicularly to the edges 13 and 19 of the body 11 and receive respective guide means 31, 33 of a fitting 30 having a body with straight portions 35 and 37 defining respective bottom flat edges 47 and 45, and with a central portion of triangular right-angled configuration having edges 39 and 41 meeting at an apex 43. The apex 43 is oblique with respect to the edges 47 and 45 and defines a right angle symmetrical about the centerline 54. Indicia 49, also symmetrical about the centerline 54, define distances of the apex 43 from a line 51 perpendicular to the centerline 54.

Along the line 51, a plurality of holes 53 are provided at various distances as shown by the indicia 56 printed thereon. Some of the indicia comprise inches and others comprise millimeters.

With further reference to FIGS. 2–3, a door is designated by the reference numeral 1 and is seen to include side edges 2 and 3 that perpendicularly meet at a corner 4. In FIG. 2, the bottom edges 45, 47 of the fitting 30 are seen engaging the side edge 2 of the door 1 with various ones of the holes 53 superimposed over the surface 5 of the door 1 so that various locations may be suitably marked for later drilling for door hardware.

As shown in FIG. 3, the edges 39, 41 of the fitting 30 engage the edges of the door 2, 3 while the apex 43 of the fitting 30 engages the corner 4 of the door 1. As shown, various ones of the holes 53 are superimposed over the surface 5 of the door 1 so that various locations may be marked for subsequent drilling for installation of door hardware.

With reference to FIG. 1, a drawer is generally designated by the reference numeral 100 and includes a corner 104, a top edge 102 and a side edge 103. Three pieces of masking tape are shown designated by the reference numerals 105, 109 and 113. In order to properly horizontally align the device 10 on the face 101 of the drawer 100, the pieces of tape 105 and 109 are attached vertically on the face 101 and their ends are trim so that their ends lie flush with the edges of the face 101, for example, the top edge 102 and the bottom edge 106. Thereafter, the pieces of tape 105 and 109 are partially removed from the face 101 and folded upon themselves with, for example, the portions of the pieces of tape 105 and 109 adjacent the edge 106 being removed from the face 101 of the drawer 100 and folded toward the portions of the pieces of tape 105 and 109 adjacent the top edge 102. When this procedure has been performed, a crease 107 is formed in the piece of tape 105 and a crease 111 is formed in the piece of tape 109. By definition, these creases 107 and 111 are precisely at the midpoint of the face 101 of the drawer 100. Thereafter, the line 51 on the device 10 may be aligned with the creases 107 and 111 to properly horizontally align the device 10 on the face 101 of the drawer 100. Thereafter, the piece of tape 113 may be suitably placed directly horizontally across the face 101 of the drawer 100. The same technique may be employed with the piece of tape 113 creating a crease 114 that may be aligned with the line 54 on the device 10 to center th e device 10 in the horizontal direction.

FIGS. 4–7 show a second embodiment 60 of the present invention. The marking template 60 is identical to the marking template 10 concerning the slots 25, 27, the fitting 30, the indicia 49 and the edges 23, 13 and 15. The template 60 differs from the template 10 as replacing the line 51 and holes 53 with alternative structure.

Figure 4:
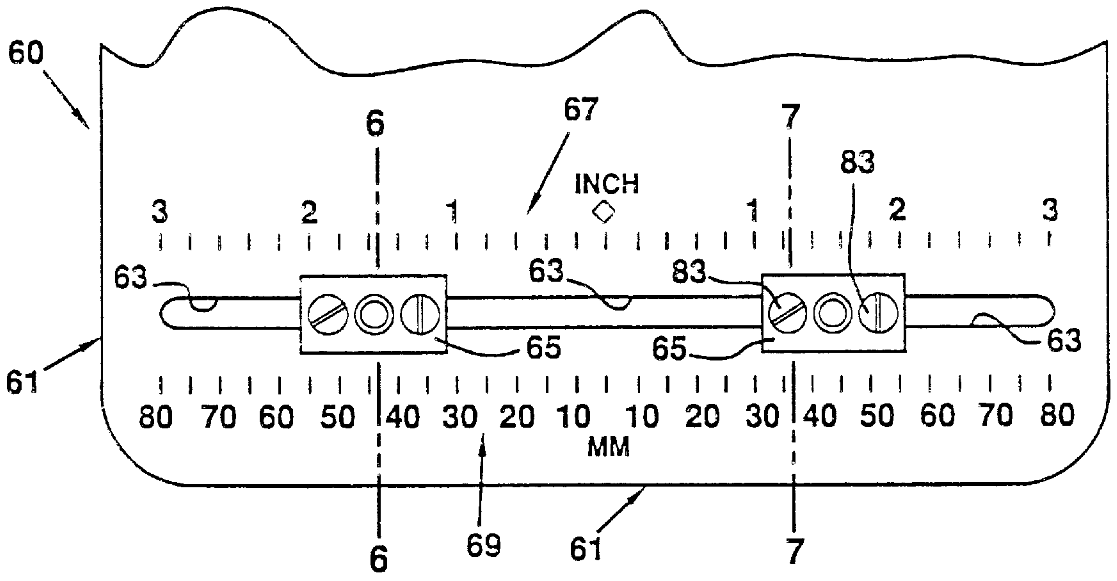
FIG. 4 shows a top view of pertinent portions of a second embodiment of the present invention.
Figure 5:
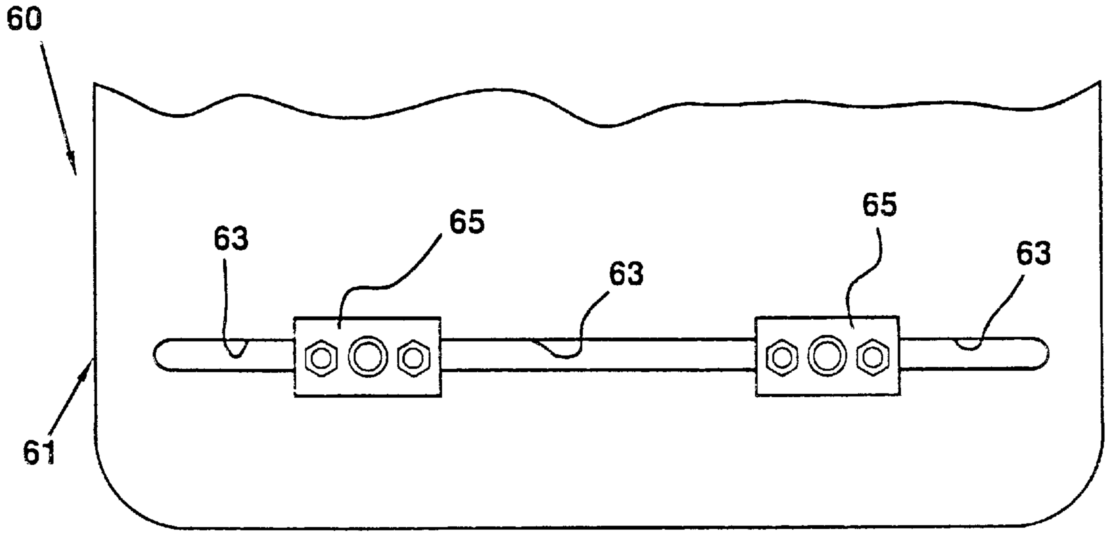
FIG. 5 shows a bottom view of the embodiment of FIG. 4.
Figure 6:
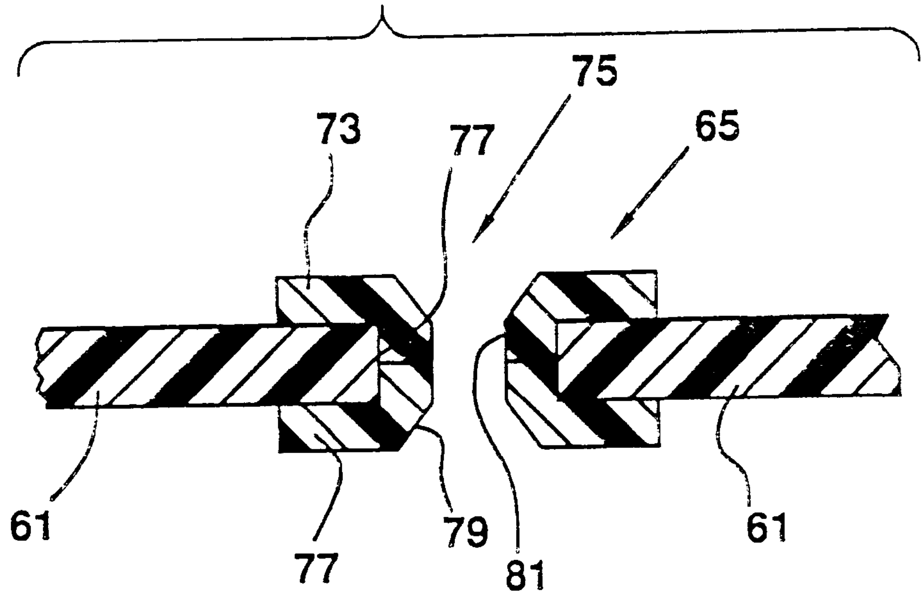
FIG. 6 shows a cross-sectional view along the line 6—6 of FIG. 4.
Figure 7:
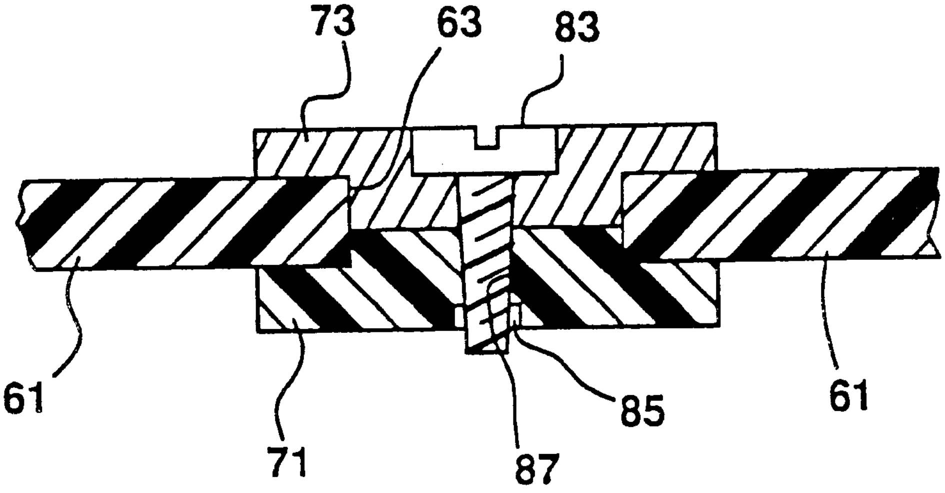
FIG. 7 shows a cross-sectional view along the line 7—7 of FIG. 4.

With reference to FIGS. 4 and 5, it is seen that the template 60 includes a body 61 including a horizontally elongated slot 63 with indicia 67, 69 above and below the slot 63, respectively. Within the slot 63, two clamp members 65 are slidably disposed. As best seen with reference to FIGS. 6 and 7, each clamp member 65 includes a hole 75 including a conical top section 77, a cylindrical central section 81, and a conical lower section 79. Each clamp member 65 is made of an upper half 73 and a lower half 71 with a horizontal dividing line therebetween. With reference to FIGS. 4 and 7, in particular, screws 83 extend through the halves 73, 71 of the clamp member 65 and a nut 85 is provided for each screw 83 allowing the screw 83 to be tightened within a threaded opening 87 through the halves 73, 71 so that each clamp member 65 may be locked in any desired location along the slot 63.

As should be understood, when it is desired to move a clamp member 65 to a desired location along the slot 63, the screws 83 are slightly loosened and the clamp member 65 is slid along the slot 63 to the desired location whereupon the screws 83 are tightened. The hole 75 is located with respect to the indicia 67, 69 as desired. Thereafter, a marking instrument may be extended through a hole 75 to mark a desired location on a door 1.

In the preferred embodiment of the present invention, the body 11 or 61, and the fitting 30 and clamp members 65 are made of suitable molded plastic. The screws 83 and nuts 85 are preferably made of metal. Of course, the bodies 11, 61 may also be made of wood or metal, as desired.

While the present invention, in its embodiments, has been disclosed as a marking template, if desired, the various holes and openings therethrough may also be used as drill guides.

As such, an invention has been disclosed in terms of preferred embodiments thereof which fulfill each and every one of the objects of the invention as set forth hereinabove and provide a new and useful marking template for locating holes for installation of door and drawer hardware of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

We claim:

1. A marking template, comprising:

a) a flat body;

b) a fitting mounted on one surface of said body and slidable thereon between two extreme positions, said fitting having a flat edge connected to a right-angle edge disposed obliquely with respect to said flat edge, said flat edge having a free end remote from said right-angle edge, said right-angle edge comprising two perpendicular edge portions;

c) at least one hole through said body adapted to receive therethrough a marking implement; and d) said flat edge being adapted to engage a side of a door and said right-angle edge being adapted to engage a corner of a door.

2. The template of claim 1, wherein said fitting has a further flat edge on a side of said right-angle edge remote from said first-mentioned flat edge.

3. The template of claim 1, further including a line marked on said one surface of said body perpendicular to a direction of sliding of said fitting, said hole being located on said line.

4. The template of claim 3, wherein said hole comprises one of a plurality of holes located on said line.

5. The template of claim 4, further including an indicium for each hole indicating a location thereof with respect to a reference point on said one surface.

6. The template of claim 3, said line comprising a first line, said right-angle edge being symmetrically disposed with respect to a second line on said one surface perpendicular to said first line.

7. The template of claim 1, further including a slot through said body extending parallel to said flat edge.

8. The template of claim 7, wherein said hole is located on a clamp member slidably movable in said slot.

9. The template of claim 7, wherein said at least one hole comprises a plurality of holes, each hole being located on a separate clamp member for each hole, said clamp members being slidably movable in said slot.

10. The template of claim 9, wherein each clamp member includes locking means for locking a position thereof.

11. A marking template, comprising:

a) a flat body;

b) a fitting mounted on one surface of said body and slidable thereon between two extreme positions, said fitting having a flat edge connected to a right-angle edge disposed obliquely with respect to said flat edge, said flat edge having a free end remote from said right-angle edge, said right-angle edge comprising two perpendicular edge portions, said fitting having a further flat edge on a side of said right-angle edge remote from said first-mentioned flat edge;

c) at least one hole through said body adapted to receive therethrough a marking implement; and d) said flat edge being adapted to engage a side of a door or drawer and said right-angle edge being adapted to engage a corner of a door or drawer.

12. The template of claim 11, further including a line marked on said one surface of said body perpendicular to a direction of sliding of said fitting, said hole being located on said line, said hole comprising one of a plurality of holes located on said line.

13. The template of claim 11, said line comprising a first line, said right-angle edge being symmetrically disposed with respect to a second line on said one surface perpendicular to said first line.

14. The template of claim 11, further including a slot through said body extending parallel to said flat edge, said hole being located on a clamp member slidably movable in said slot.

15. The template of claim 14, wherein each clamp member includes locking means for locking a position thereof.

* * * * *